Figure 1:
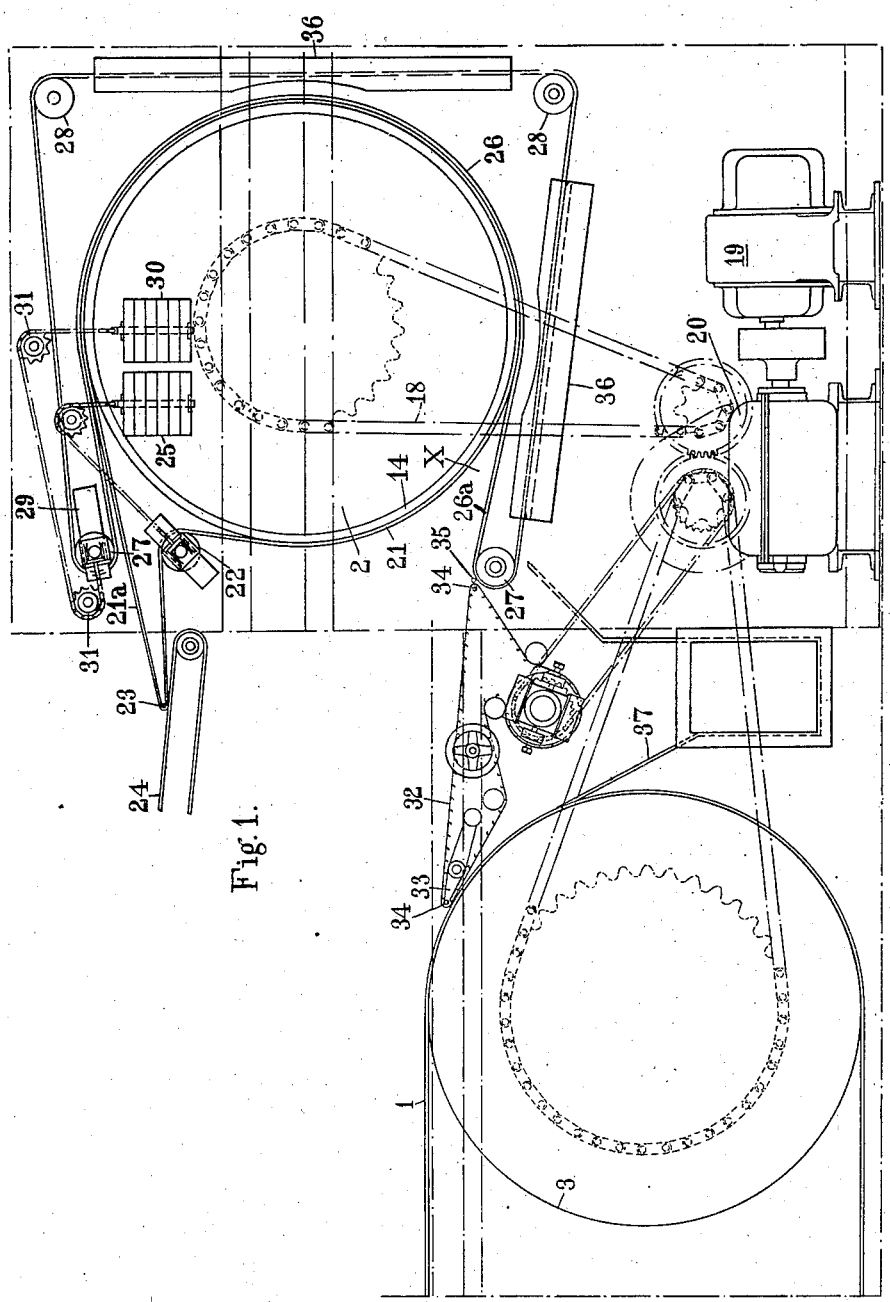

Aug. 15, 1944. R. F. MACFARLANE ET AL 2,355,879
MEANS FOR TRANSPORTING BISCUITS OR LIKE ARTICLES
Filed July 18, 1942 2 Sheets-Sheet 1

Inventors
R. F. Macfarlane
C. Dumbleton
By Glascock Downing Seebold
Attys.

Aug. 15, 1944.   R. F. MACFARLANE ET AL   2,355,879
MEANS FOR TRANSPORTING BISCUITS OR LIKE ARTICLES
Filed July 18, 1942   2 Sheets-Sheet 2
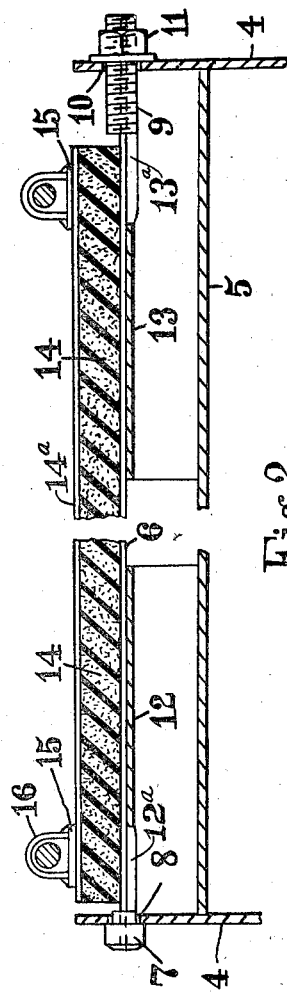
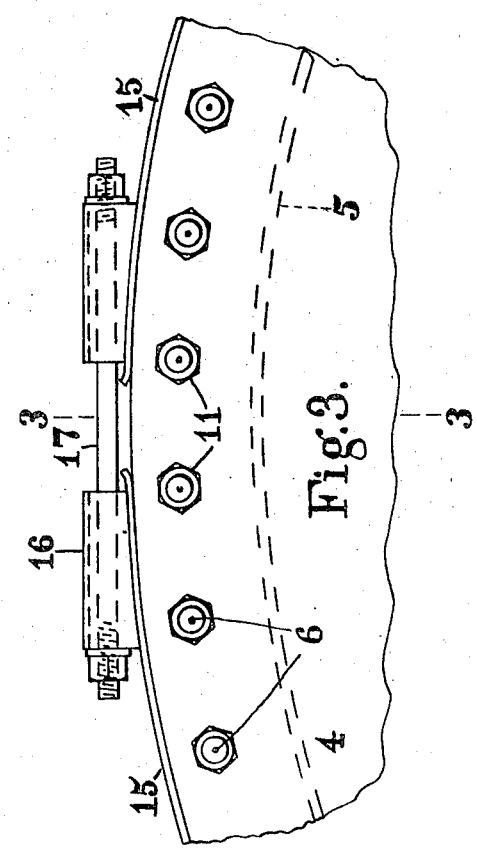
Inventors
R. F. Macfarlane
C. Dumbleton
By Hascock Downing Seebold
Attys.

Patented Aug. 15, 1944

2,355,879

UNITED STATES PATENT OFFICE 2,355,879

MEANS FOR TRANSPORTING BISCUITS OR LIKE ARTICLES

Robert French Macfarlane, Osterley, and Claude Dumbleton, Peterborough, England, assignors to Baker Perkins Limited, Peterborough, England Application July 18, 1942, Serial No. 451,482
In Great Britain July 3, 1941

5 Claims. (Cl. 198—167)

This invention relates to means for transporting biscuits or like articles from one level to another. While the invention is applicable to the transportation of a variety of kinds of articles, it is primarily intended for use in conjunction with biscuits or like fragile articles and is particularly suitable for use in conjunction with articles which are delivered in a continuous train of rows or spaced groups or batches. For convenience hereinafter the invention will be described with reference to biscuits.

In British Patent Specification No. 536,262 there is described means for conveying biscuits from one level to another, comprising a roller which is lapped by an endless travelling band between which and the roller biscuits are engaged so that they are carried round the roller and delivered to a conveying surface at another level, the biscuits being inverted in the transfer.

The invention is concerned with biscuit conveying means of the character described in the above British patent and is adapted to afford a more delicate handling of the biscuits and such that transit both upwardly and downwardly is facilitated, it being an aim of the invention to provide continuously operating means adapted to handle large numbers of biscuits in such a manner as to reduce the percentage of breakages or damage to an insignificant quantity.

The invention consists in means for transporting biscuits or like articles from one level to another comprising a soft padded wheel or drum (hereinafter referred to as a drum) of relatively large diameter and lapped by an endless band driven solely from the padded drum and contacting with the biscuits which lie between the drum and the band. By "a drum of relatively large diameter" is meant a drum the diameter of which is such as to afford an arcuate surface under a biscuit of normal size, which is substantially flat, particularly having regard to the "give" afforded by the softness of the padding.

The invention further consists in means as described in the preceding paragraph having an inner endless band employed between the padded drum surface and the biscuits which are lapped by the outer band, that is the band mentioned in the previous paragraph, the arrangement being such that the inner band serves as a lead-off for the biscuits in discharging them from the drum.

The invention may be employed for transporting biscuits from one level to another, or in a series of flights from one floor of a building to another in which case a series of conveyors are provided at alternate ends which transfer padded drums are lapped by endless travelling bands.

The distance apart of the longitudinal conveying surfaces will depend upon the diameter chosen for the transfer drums. The conveying surfaces at the respective levels may be horizontal or they may be arranged at a suitable incline to assist in raising or lowering the biscuits from one floor or level to another floor or level.

In the accompanying drawings:

Figure 1 is a side view partly in section, of a biscuit transporting device according to the invention, Figures 2 and 3 are details of the drum construction, Figure 3 being a section on the line 3—3 of Figure 2.

In carrying the invention into effect according to one convenient mode, as described by way of example, for discharging the biscuits from a continuously delivering oven, such as a steel band oven 1, a large diameter drum 2, which may be some 5 ft. in diameter, is mounted upon ball bearings upon a stationary shaft to rotate freely with its axis parallel to the terminal roller 3 of the steel band of the oven. The drum 2 is constructed of end discs or spiders 4 secured to a cylindrical wall 5 and a cage or framework adapted to afford a resilient cylindrical surface. For example the cage or framework may be made of a large number of rods or wires 6 parallel with the axis of the drum. Each wire is anchored at one end by a nipple 7 located in apertures 8 in an end disc 4 and at the other end by a screwed tube 9 extending through an aperture 10 in the other disc 4, straining being effected by a nut 11. Adjacent their ends the wires 6 lie in contact with cylindrical flanges 12, 13 secured as by welding to the discs 4. The flanges 12 and 13 are provided with slots 12a and 13a to accommodate the nipples 7 and screws 9 associated with the wires 6. The surface of the wire or cagework is padded with wadding 14, sponge rubber or other soft padding material which is secured adjacent its edges by clamping bands 15 which clamp it to the flanges 12, 13. The bands 15 are semi-circular and are provided with clamping bosses 16 to receive bolts 17. The padding may be covered with a suitable impregnated cloth such as indicated at 14a, to prevent passage of grease or fat to the padding. The padding 14 is such that when a biscuit of normal size, say of 2″–3″ across, is pressed against such surface, the surface immediately under the biscuit gives and accommodates the biscuit so that it forms a substantially flat bed for the biscuit. The drum 2 is driven by chain and sprocket means 18 from the motor 19 and gear 20 which drives the oven band so that its peripheral speed may agree with that of the oven band.

Around the padded drum 2 is lapped a soft endless band 21, for example one of flannel, so that the drum surface is almost completely enclosed, the band 21 being led off over a tension guide roller 22 and around a small terminal roll 23 positioned away from the drum surface at its upper side and close to the surface of the conveyor 24 at the higher level to which the drum is to deliver. Instead of travelling around a roll 23 of small diameter the band may be passed around a smooth knife blade of known form for the purpose of delivery. When a roll 23 is employed an inclined plate or blade may be provided to bridge the gap between the roller and the higher level conveyor surface 24. The guide roller 22 may be tensioned by springs or by weights 25, the latter being preferred. The band 21 is driven by contact with the padded drum 2 and the lead-off portion 21a serves for discharging the biscuits which are carried round the drum 2 on the surface of the band, as will be referred to again later.

A second and outer endless band 26 is lapped around the first-mentioned band 21 so that about half of the cylindrical surfaces of the drum 2 which is remote from the oven is enclosed. The outer band 26 which is also of soft material such as flannel, is mounted on guide rollers 27, 28 the terminal ones 27 of which are positioned to cause the band to be extended away from the drum surface at a tangent, the lower extension 26a serving as a reception area for the biscuits coming from the oven. The outer band 26 is also under gravity tension. For example, its upper terminal roller 27 may be mounted in slidable bearings 29 and connected to weights 30 operating over a pulley means 31 upon the terminal roller to hold the band 26 with uniform tightness over the drum surfaces. Laterally adjustable troughs 36 are provided for tracking the band 26.

A bridging conveyor 32 may be positioned between the lower terminal roller 27 of the outer band 26 and the steel band 1 of the oven as it passes over the crest of its terminal roller. This endless receiving band or bridging conveyor 32 may be driven from the same source of power as drives the padded drum 2 and at its oven end may pass over a knife edge 33 so that the biscuits readily ride on to the bridging conveyor from the oven band. The drum end of the conveyor 32 may pass around a knife edge or small roller 34 so that the biscuits pass either directly or over an inclined plate or rod 35 on to the upper surface of the outer endless band 26 around the drum where the position of its terminal roller 27 affords a receiving extension 26a.

The conveyor 32 may be of openwork type or solid, preferably of woven metallic material to withstand the heat of the oven band 1 when the terminal roll 3 of the oven is located close to the oven discharge. The knife edge 33 is mounted so that it may be pivoted out of operative position to allow the biscuits to be delivered from the oven into a chute 37 when it is desired to deliver bulk biscuits from the oven on to the same floor on which it is located.

The second or outer band 26 is not driven by any positive means but, being firmly stretched over the inner band 21, the biscuits sink or key into it and assist in causing the band to be driven from the drum alone.

In operation, as the biscuits proceed from the oven 1 they are carried out upon the bridging conveyor 32 and deposited continuously upon the tangential extension 26a of the outer band. The biscuits are carried forward and engaged in the nip X between the outer band 26 and the inner band 21 upon the drum, so that they are lightly pressed against the band 21 and padding 14 of the drum and held in position by the tension of the outer band 26. The outer and inner bands 26, 21 move together with the padded drum 2 and transport the biscuits around the periphery without relative movement and without placing undue or breaking strains upon the biscuits. As the biscuits pass over the top of the drum 2 they proceed towards the upper level conveyor surface 24 upon the lead-off portion 21a of the inner band 21. The upper level conveyor 24 carries the biscuits on an upward incline to the next turning point where a padded drum, similar to that already described and equipped with lapping bands, carries the biscuits around on to another conveyor at a still higher level. In this way it will be appreciated that the biscuits may be transported from level to level to any desired height, such as from one floor to the next or from floor to floor throughout the height of a building or from the baking level up to a cooling conveyor system.

It will be understood that by lapping the padded drum 2 and biscuits with the outer band 26 under gravity tension so that the band is driven solely by its engagement with the biscuits and the padded surface, there is no relative movement between the biscuits and the band 26 and there is no trouble through "creep" arising due to slight difference in driving speeds, as might occur if the band 26 were positively driven by means other than the drum. The biscuits moreover are maintained in the same order or formation as received from the oven conveyor.

While the invention has been described with reference to the transportation of biscuits upwardly from one level to another, it may be applied to the transportation of biscuits downwardly from one level to another, and in most cases means devised for transporting the biscuits in one direction may be used for transportation of biscuits in the other direction merely by reversal of the drums and the respective bands or conveyors. In some cases, a transfer drum will operate between two endless horizontal or inclined endless conveyors but it is to be understood that a transfer drum (or drums) may be used between two machines at different levels or between one machine at one level and a conveyor at another level.

We claim:

1. Apparatus for transporting biscuits or like articles from one level to another comprising a rotatably mounted drum of relatively large diameter, said drum including a pair of discs, a plurality of spaced wires supported by said discs, said wires being arranged parallel to the axis of the drum, a soft padding covering the wires and supported thereby, means for rotating the drum, an endless band lapping the drum and driven from the drum, an inner endless band located between the padding and said lapping band, said inner band having a biscuit delivery portion for discharging the biscuits which lie between the two bands.

2. Apparatus for transporting biscuits comprising an endless oven band, an endless bridging conveyor adapted to receive biscuits from said oven band and deliver them to transporting means comprising a rotatably mounted drum of relatively large diameter, means for rotating the drum, said drum having a soft padded surface, an endless band lapping the drum and having a part extending tangentially from the drum, and adapted to receive biscuits from the bridging conveyor, an inner endless band located between the padded surface and the lapping band, said inner band substantially enclosing the padded surface of the drum and being led off over a tension roller and a terminal element to form a conveyor delivery portion, and conveyor means underlying said terminal to receive biscuits from said portion.

3. An apparatus as claimed in claim 1 characterized by the provision of adjustable means for tensioning said wires.

4. An apparatus as claimed in claim 1 characterized by the provision of flanges carried by said end discs and underlying the portions of said wires adjacent said discs.

5. An apparatus as claimed in claim 1, characterized by the provision of flanges carried by said end discs and underlying the portions of said wires adjacent said discs, and clamping means applied to the portions of the padding overlying said flanges.

ROBERT FRENCH MACFARLANE.
CLAUDE DUMBLETON.